No. 866,903. PATENTED SEPT. 24, 1907.
W. C. ALLBRITTON.
CULTIVATOR ATTACHMENT.
APPLICATION FILED NOV. 2, 1906.
2 SHEETS—SHEET 2.
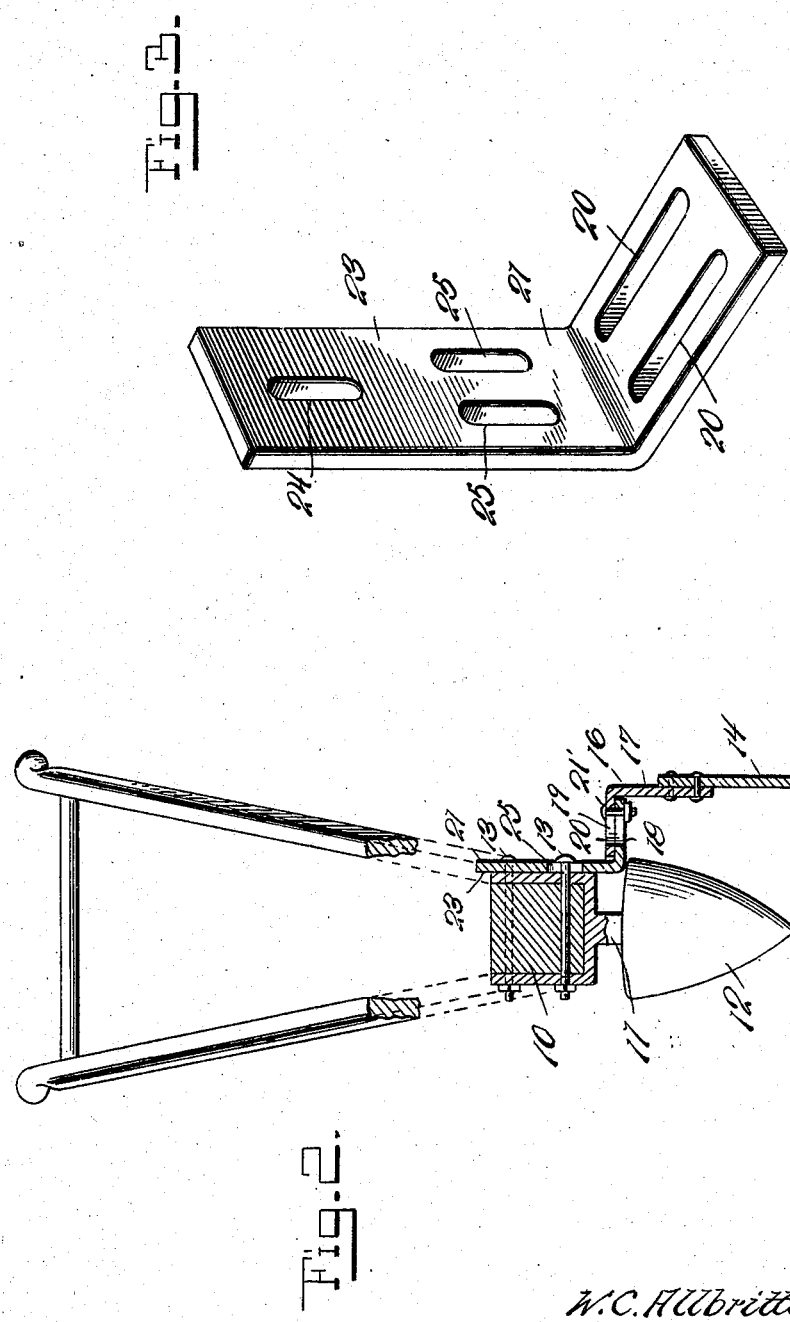
Witnesses
G. R. Thomas
Inventor
W. C. Allbritton
By Chandler & Chandler
Attorneys

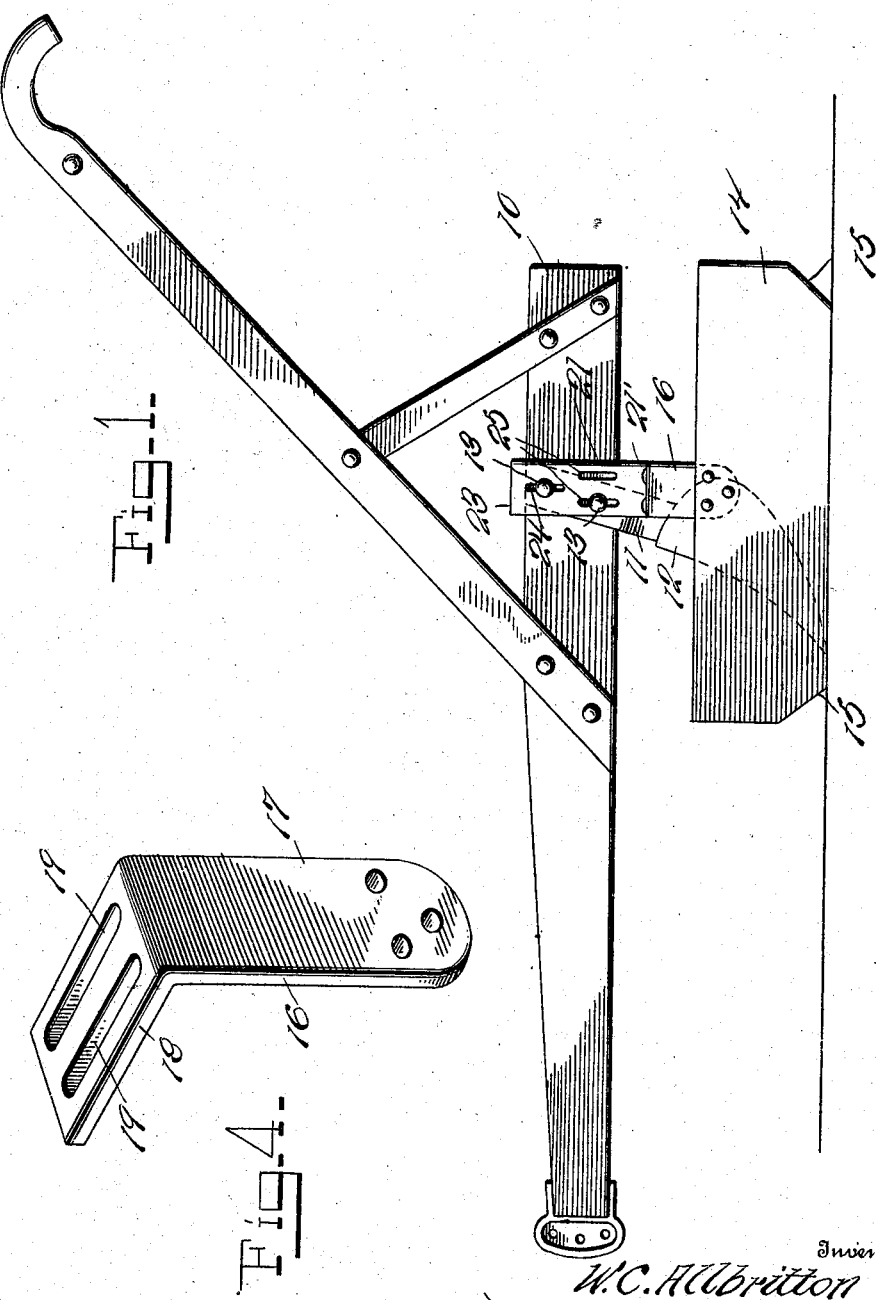

UNITED STATES PATENT OFFICE.

WILLIE C. ALLBRITTON, OF CAIRO, GEORGIA.

CULTIVATOR ATTACHMENT.

No. 866,903.  Specification of Letters Patent.  Patented Sept. 24, 1907.

Application filed November 2, 1906. Serial No. 341,760.

*To all whom it may concern:*

Be it known that I, WILLIE C. ALLBRITTON, a citizen of the United States, residing at Cairo, in the county of Grady, State of Georgia, have invented certain new and useful Improvements in Cultivator Attachments; and I do hereby declare the following to be a full, clear, and exact description of the invention, such as will enable others skilled in the art to which it appertains to make and use the same.

This invention has relation to fenders for attachment to cultivators or plows employed in cultivating corn, cotton, tobacco, and similar growing crops, particularly when the plants are young and small; it being the office or function of the fender to ward off the clods, stones, large quantities of earth, and similar matters from the plants, that would otherwise be thrown thereon.

The invention may be embodied in a fender consisting of an elongated plate that may be adjustably supported from either side of the plow beam or stock at the side of the plow or cultivator or scraper blade, and between it and the row of plants.

I have contemplated the use of means of various forms for supporting the fender in proper position. However the device shown in the annexed drawings, forming a part of this specification, embodies the invention and the same will first be described with respect to its construction and mode of operation and then be pointed out in the subjoined claims.

Of the said drawings:—Figure 1 is a side elevation of the plow or cultivator equipped with my improved fender. Fig. 2 is a transverse vertical section through the plow. Fig. 3 is a perspective view of a bracket. Fig. 4 is a perspective view of a second bracket.

Similar numerals of reference designate similar parts or features, as the case may be, wherever they occur.

In the drawings, 10 designates the beam of a plow or cultivator having the shank 11 of the plow or cultivator blade 12 secured therein or thereto by two, or it may be more transverse bolts 13, extending through the shank and beam.

14 designates the fender-blade constituting a part of my invention which consists of a plate of suitable size and thickness, having the ends of its lower edge, which runs upon the ground, beveled as at 15, so as to glance over roots, stones, and other like objects while it is in use. As merely indicating the form of a fender that may be suitable for ordinary purposes, it may be stated that it may be eight inches high, fourteen inches long and a quarter of an inch in thickness.

To the upper side of the blade or fender 14 there is riveted the vertical part 17 of the intermediate angular piece 16 the horizontal portion 18 of which is provided with two slots 19, through which and through like slots 20 in the horizontal part of the upper angular piece 21', two bolts 21 are passed to secure the said two horizontal portions together the slots through which the securing bolts pass permitting the lateral adjustment of the piece 16 that is riveted to the fender, and thus adjust the fender nearer to or further from the cultivator blade or scraper, 12. The vertical portion 23 of the upper angular piece 21 is provided with an upper slot 24 and two lower slots 25, the latter being in the same horizontal plane for the attachment of the said portion to the plow stock or beam, which may be done by the two bolts 12, which secure the shank of the plow to the beam. The upper bolt 13 is passed through the upper slot 24, while the lower bolt is passed through either of the lower slots, 25, depending upon which side of the plow beam the fender is attached, it being desirable to throw the major part of the fender to the rear of the plow or cultivator or scraper blade and adjust it otherwise so that it may take proper position on the ground. With the last mentioned facts in view it will be apparent that the precise adjusting means and method described need not be adhered to, but may be varied to meet different forms of plow stocks or beams and other exigencies.

The manner of using the invention is apparent from the foregoing description. With the fender properly adjusted on either side of the plow stock it will run with its lower edge on the ground between and near to the row of growing plants, warding off any damage thereto by the action of the cultivator blade which operates to destroy the grass and weeds between the rows and to loosen the soil along, the said line.

It is obvious that various changes may be made in the form and arrangement of parts and features coming within the limits of mechanical skill without departing from the general nature or spirit of the invention.

What is claimed as the invention, is:—

The combination, with the beam and the fender, of an intermediate angular piece having slots in its horizontal portion and to the vertical portion of which the fender is riveted, an angular plate provided with slots in both its vertical and horizontal portions, the latter portion being adjustably connected with the horizontal portion of the angular piece and the vertical portion of the latter piece being likewise connected with the beam.

In testimony whereof, I affix my signature, in presence of two witnesses.

WILLIE C. ALLBRITTON.

Witnesses:
 B. N. BAGGETT,
 J. A. ALDREDGE.